(12) United States Patent
Delayre

(10) Patent No.: US 11,305,578 B2
(45) Date of Patent: Apr. 19, 2022

(54) AIRCRAFT WHEEL WITH A REMOVABLE RIM FLANGE

(71) Applicant: SAFRAN LANDING SYSTEMS, Velizy-Villacoublay (FR)

(72) Inventor: Xavier Delayre, Velizy-Villacoublay (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 562 days.

(21) Appl. No.: 15/826,564

(22) Filed: Nov. 29, 2017

(65) Prior Publication Data

US 2018/0147885 A1    May 31, 2018

(30) Foreign Application Priority Data

Nov. 30, 2016   (FR) .................................... 16 61717

(51) Int. Cl.
*B60B 25/14*     (2006.01)
*B60B 3/02*      (2006.01)
(Continued)

(52) U.S. Cl.
CPC ............... *B60B 25/14* (2013.01); *B60B 3/02* (2013.01); *B60B 25/08* (2013.01); *B60B 25/20* (2013.01);
(Continued)

(58) Field of Classification Search
CPC ......... B60B 25/14; B60B 25/16; B60B 25/18; B60B 25/20; B60B 25/04; B60B 25/045;
(Continued)

(56) References Cited

U.S. PATENT DOCUMENTS 1,880,641 A * 10/1932 Woodward .............. B60B 25/18
                                                          301/35.628
2,523,756 A *  9/1950 Frank .................... B60B 27/001
                                                              301/62
(Continued)

FOREIGN PATENT DOCUMENTS

DE          3630226 A1    3/1987
FR       3 015 951 A1    12/2013

OTHER PUBLICATIONS

French Search Report and Written Opinion dated Aug. 23, 2017, for French Application No. 1661717, filed Nov. 30, 2016, 6 pages.

*Primary Examiner* — Scott A Browne
(74) *Attorney, Agent, or Firm* — Christensen O'Connor Johnson Kindness PLLC

(57) ABSTRACT

An aircraft wheel rim includes a main portion and a removable portion. The main portion includes a hub and a disk extending between the hub and an annular outer portion that receives a tire and is shaped to form a rim one of its sides of the annular outer portion. A second side of the annular outer portion is shaped to receive the removable portion, which forms a second flange on the second side of the annular outer portion after a tire has been put into place. The rim further includes a blocking device that limits rotation of the removable portion relative to the main portion. The blocking element include at least one key having a head engaged in a matching receptacle in the removable portion and a root engaging a steel peg that is shrink fitted in the main portion.

9 Claims, 3 Drawing Sheets

(51) Int. Cl.
    *B60B 25/20*         (2006.01)
    *B60B 25/08*         (2006.01)
    *B64C 25/36*         (2006.01)

(52) U.S. Cl.
    CPC ........ *B64C 25/36* (2013.01); *B60B 2360/104* (2013.01); *B60Y 2200/51* (2013.01)

(58) Field of Classification Search
    CPC ......... B60B 25/06; B60B 25/08; B60B 25/22; B60B 2360/104; B64C 25/36
    See application file for complete search history.

(56) References Cited

U.S. PATENT DOCUMENTS

| | | | | |
|---|---|---|---|---|
| 3,224,484 | A * | 12/1965 | Smith | B60B 25/14 |
| | | | | 152/410 |
| 3,529,869 | A * | 9/1970 | Casey | B60B 25/04 |
| | | | | 301/11.1 |
| 4,046,184 | A * | 9/1977 | Diehl | B60B 23/10 |
| | | | | 152/407 |
| 9,676,231 | B2 * | 6/2017 | Baldassara | B60B 23/08 |
| 2007/0227639 | A1 | 10/2007 | Cortes | |
| 2015/0217599 | A1 * | 8/2015 | Zehnder | B60B 3/02 |
| | | | | 301/29.2 |

* cited by examiner

AIRCRAFT WHEEL WITH A REMOVABLE RIM FLANGE

BACKGROUND

The present disclosure relates to aircraft wheels and, in particular, to an aircraft wheel with a removable rim flange.

Some known aircraft wheel rims are known to include a hub connected by a disk to an annular outer portion that is to receive a tire. On each side, that annular outer portion has a flange extending radially, one of which is removable in order to enable a tire to be mounted on the wheel. The removable flange is then put back into place on the rim and secured thereto with a locking ring that prevents the removable flange from separating from the rim. It has been found necessary to prevent the removable flange from moving in rotation, in order to avoid using any shrink fit between the removable flange and the rim.

Document FR3015951 discloses such a rim on which the removable flange is prevented from moving in rotation by using two links mounted symmetrically relative to each other with an oblique angle between the removable flange and the rim. Nevertheless, fastening those links to the rim requires a tapped orifice to be made in the rim in order to receive a screw for fastening the link.

OBJECT OF THE INVENTION

The present disclosure is directed to an aircraft wheel with a removable rim flange having means for blocking rotational movement of the removable flange relative to the rest of the rim, such that a specific interface is not required on the rim for fastening said rotation-blocking means.

SUMMARY

In order to achieve this object, there is proposed an aircraft wheel rim comprising a main portion and a removable portion. The main portion includes a hub and a disk extending between the hub and an annular outer portion. The annular outer portion receives a tire and is shaped to present a rim at one side. The other side of the annular outer portion is shaped to receive the removable portion, which acts as a removable rim that is fitted onto the annular outer portion after a tire has been put into place. The rim includes one or more blocking devices that block rotation of the removable portion relative to the main portion. The blocking device includes at least one key having (1) a head engaged in a matching receptacle in the removable portion and (2) a root fastened to the main portion of the rim by at least one steel peg that is shrink fitted in the main portion and that extends parallel to an axis of rotation of the wheel in order to project from the rim and receive the root of the key.

Preferably, the peg is shrink-fitted in an orifice in the rim that is also used for receiving one end of a bar driving rotation of brake rotor disks.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The invention can be better understood in the light of the following detailed description of particular embodiments of the invention, given with reference to the figures of the accompanying drawings, in which.

DETAILED DESCRIPTION

Figure 1:
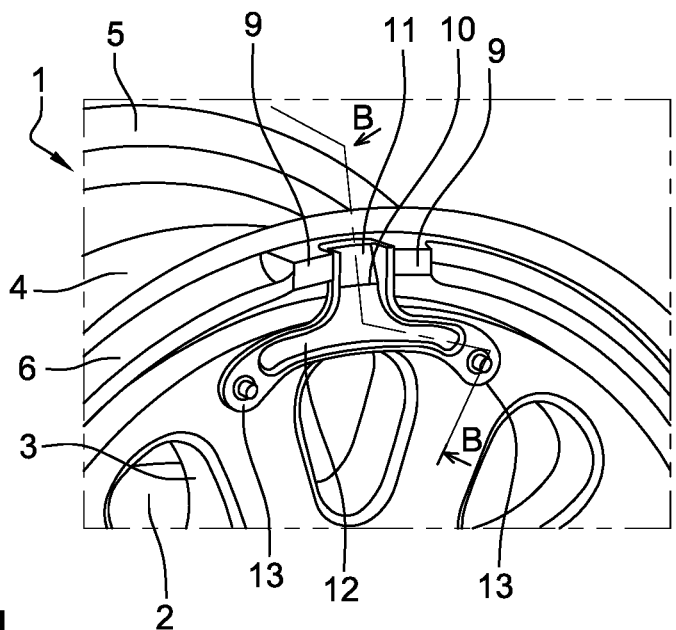
FIG. 1 is a partial perspective view of a first representative embodiment of an aircraft wheel rim according to the present disclosure.
Figure 2:
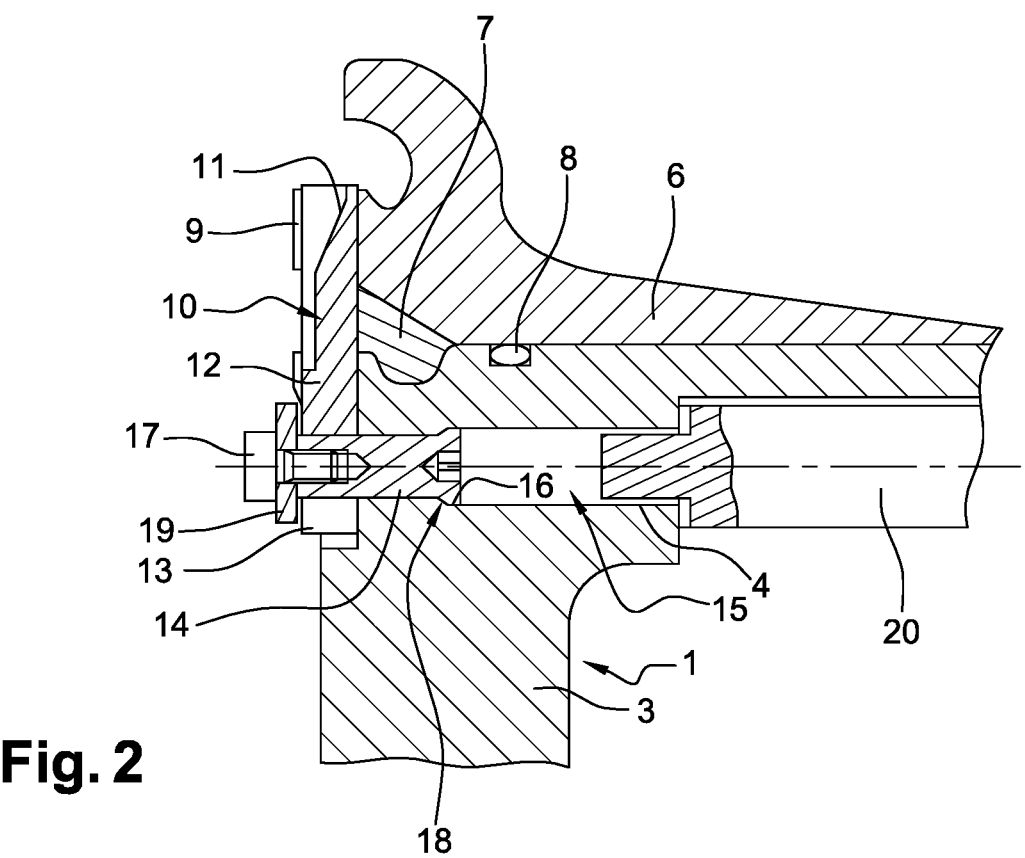
FIG. 2 is a partial cross-sectional of the aircraft wheel rim shown in FIG. 1 and indicated by broken line B-B of FIG. 1.

With reference to FIGS. 1 and 2, the a first representative embodiment of an aircraft wheel rim 1 has a hub 2 that is to receive bearings for guiding rotation of the rim on an axle of aircraft landing gear about an axis of rotation. The hub 2 is connected by a disk 3, of which there can be seen the gaps and the spokes, to an annular outer portion 4 that is to receive a tire (not shown herein). The annular outer portion 4 is terminated on one of its sides by a flange 5 made integrally therewith. Those parts together form the main portion of the rim. The main portion of the rim is associated with a removable portion, specifically a removable flange 6 that is fitted onto the other side of the annular outer portion and that can be removed in order to enable a tire to be mounted. The removable flange 6 is fitted on the rim with a ring 7 being interposed to block axial movement of the flange to prevent the flange from being extracted under the effect of the pressure in the tire. A sealing gasket 8 is interposed between the rim 1 and the removable flange 6 in order to enable the tire to be inflated. The main portion, referred to herein as the "rim" in order to simplify the description, and the removable flange are both made of aluminum alloy in this example; however it will be appreciated that the rim and the removable flanges, or portions thereof can be made of any suitable materials.

The removable flange 6 is prevented from moving in rotation on the rim 1 by a key 10 having firstly a head 11 engaged in a receptacle in the removable flange 6, which receptacle is defined circumferentially by abutments 9, and secondly a root 12 that is terminated in this example by two pierced lugs 13. In this example, the lugs 13 are engaged on steel pegs 14 that are engaged in open orifices 15 in the rim 1 that extend parallel to the axis of rotation of the rim. Each peg 14 has a flared internal end 16 that comes to bear against a shoulder 18 of the orifice 15 in order to hold it axially. The pegs 14 are shrink fitted in the ends of the orifices 16 so as to project from the rim 1 and receive the lugs of the root of the key 10.

Positioned in this way, the key 10 opposes any movement in rotation of the removable flange 6 on the rim 1, i.e., the removable flange will not rotate bout the axis of rotation of the wheel relative to the rim. The keys 10 are held in place by screws 17 that are screwed into tapped holes in the respective pegs 14 and that hold respective stopwashers 19 that prevent the lugs 13 of the key 10 engaged on the pegs 14 from moving axially, while leaving a small amount of axial clearance so as to enable suitable axial movement of the key 10 to accommodate assembly clearances or deformations of the removable flange 6.

In a particularly advantageous aspect, each orifice 15 also serves to receive the terminal finger of a bar 20 that is used for causing brake rotor disks (not shown) that are located inside the rim to be driven in rotation with the rim. Thus, the disclosed configuration provides an extended orifice 15 that opens out in the outside face of the rim, thereby enabling the orifice to receive a shrink-fit peg 14 as well as the terminal finger of the bar 20. No additional tapped orifice needs to be provided in the rim for fastening the roots of the key 10 on the rim.

Figure 3:
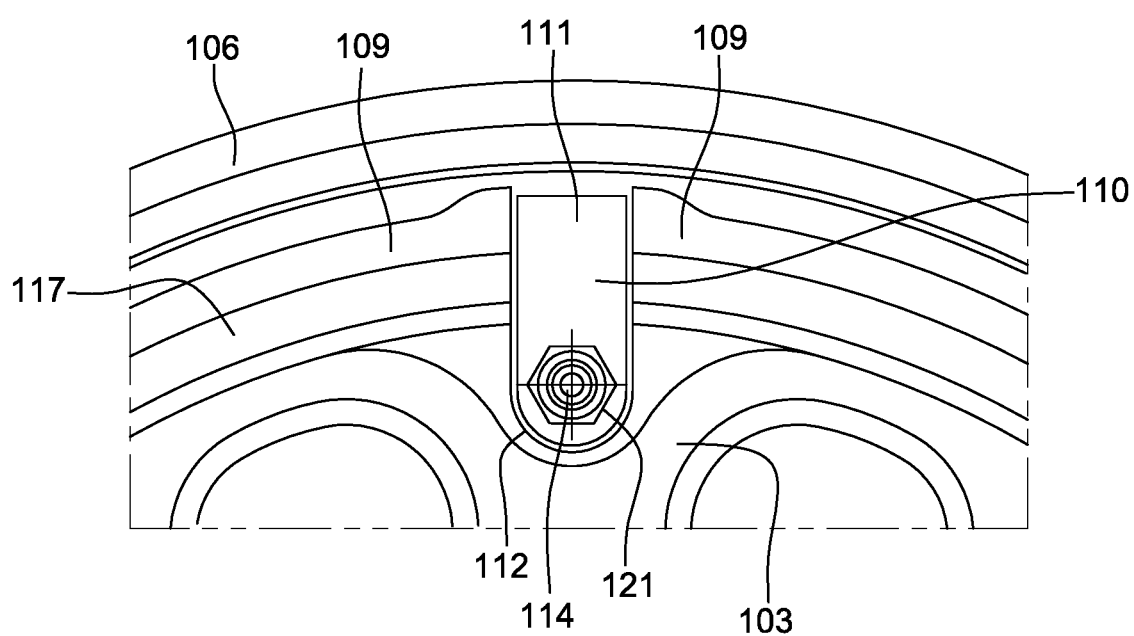
FIG. 3 is a partial side view of a second representative embodiment of an aircraft wheel rim according to the present disclosure.

In a second representative embodiment of an aircraft wheel rim 101, shown in FIG. 3, where the references of elements that are similar have been increased by one hundred, the key 110 now has a pierced straight root 112 that is engaged directly on one of the shrink-fit pegs 114 projecting from the rim 101. In this example, the end of the peg 114 is threaded in order to receive an axial stop nut 121 for holding the key 110.

Figure 4:
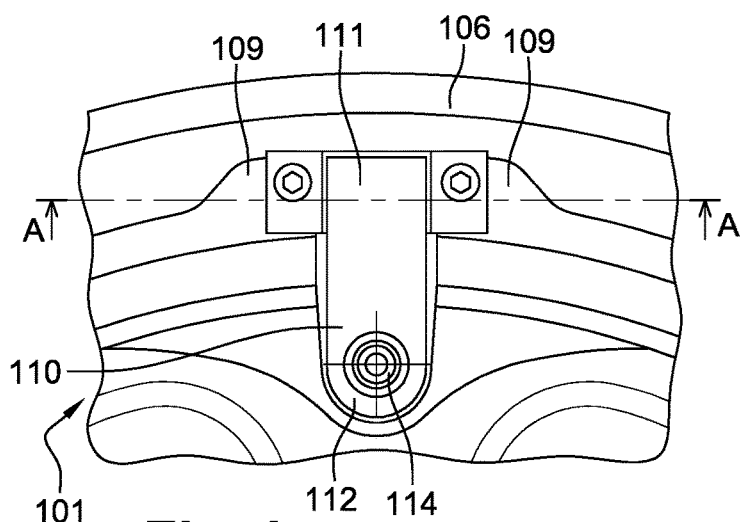
FIG. 4 is a partial side view of a first variation of the second representative embodiment of an aircraft wheel rim according to the present disclosure.
Figure 5:
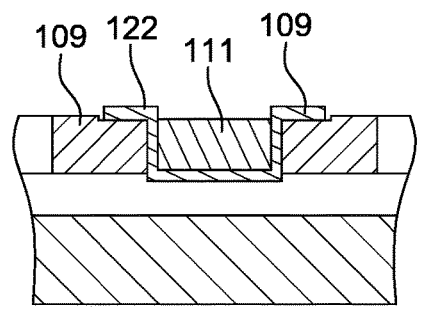
FIG. 5 is a partial cross-sectional of the aircraft wheel rim shown in FIG. 4 and indicated by broken line A-A of FIG. 4.

In a first variant of the second embodiment, shown in FIGS. 4 and 5, a bronze insert 122 is interposed between the abutments 109 of the receptacle in the removable flange 106, which insert extends between the head 111 of the key 110 and the abutment 109 in order to protect the head against fretting.

Figure 6:
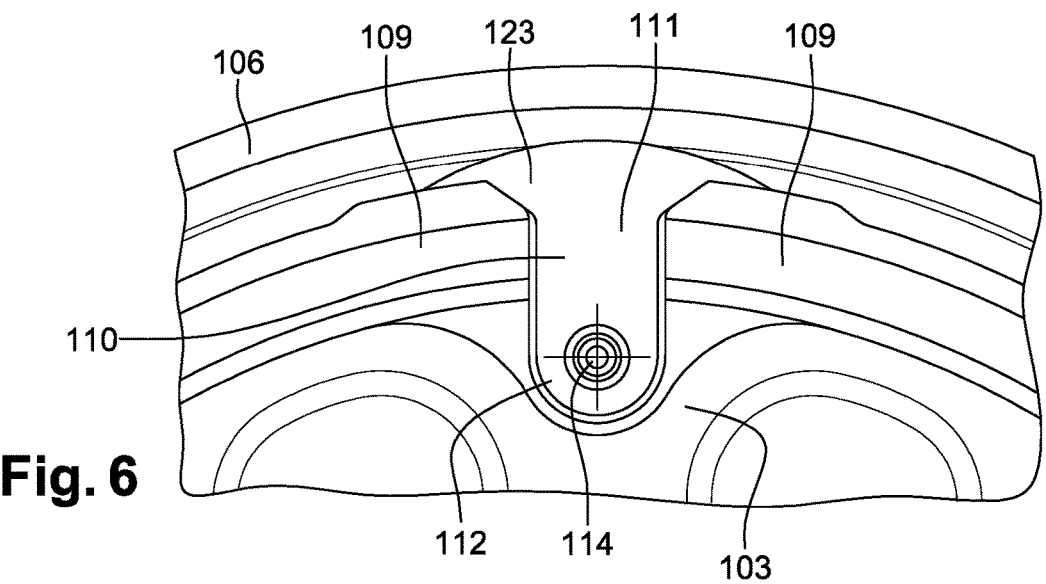
FIG. 6 is a partial side view of a second variation of the second representative embodiment of an aircraft wheel rim according to the present disclosure.

In a second variant of the second embodiment, shown in FIG. 6, the key 110 has a head 111 provided with a cap 123 that serves to cover the tops of the abutments 109 in order to obtain a self-clamping effect between the key fastened to the peg 114 and the removable flange 106 in the event of the flange tending to turn relative to the rim.

Figure 7:
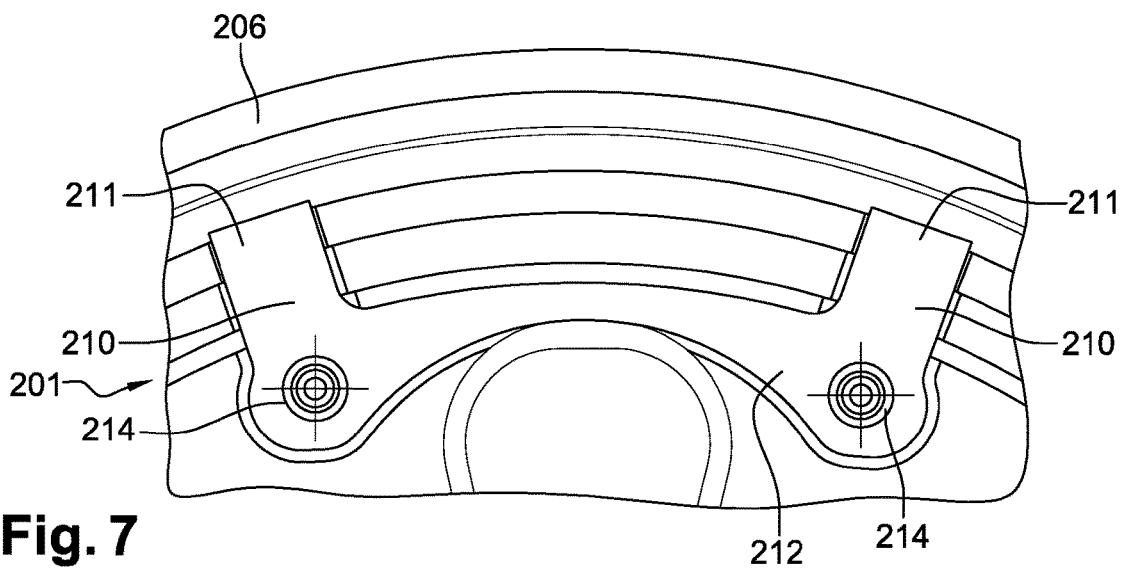
FIG. 7 is a partial side view of a third representative embodiment of an aircraft wheel rim according to the present disclosure.

Finally, in a third representative embodiment of an aircraft wheel rim 201, as shown in FIG. 7, where the references of similar elements are increased once more by one hundred, the keys 210, each having a head 211 co-operating with the removable flange 206, are now grouped in pairs, each of the pairs sharing a common root 212 that is fitted onto two pegs 214.

The invention is not limited to the above description but, on the contrary, covers any variant coming within the ambit defined by the claims.

In particular, although it is stated that the pegs 14, 114, 214 are preferably positioned and shrink-fitted in the orifices that also receive the bars for driving rotation of the rotor disks of brakes, it is naturally possible to provide specific orifices that are machined in the rim solely for receiving the pegs, particularly if the rim is not for fitting to a braked wheel.

Naturally, a plurality of keys could be provided for stopping rotation of the removable flange, e.g. three keys arranged at 120° from one another.

While illustrative embodiments have been illustrated and described, it will be appreciated that various changes can be made therein without departing from the spirit and scope of the invention.

The embodiments of the invention in which an exclusive property or privilege is claimed are defined as follows:

1. An aircraft wheel rim, comprising a main portion and a removable portion, the main portion comprising a hub, a disk extending between the hub, and an annular outer portion configured to receive a tire and having a flange at a first side, a second side of the annular outer portion being shaped to receive the removable portion, the removable portion forming a removable flange configured to be fitted onto the annular outer portion after a tire has been put into place, the rim including a blocking element shaped to block movement in rotation of the removable flange relative to the rim, wherein the blocking element comprises at least one key having a head engaged in a matching notch in the removable portion, the matching notch being configured to link in rotation the removable flange to the head of the key, and a root fastened by at least one steel peg that is shrink fitted in the main portion and that extends parallel to an axis of rotation of the wheel in order to project from the rim and receive the root of the key, wherein the peg is engaged in an orifice in the rim that extends parallel to an axis of rotation of the rim, the rim further comprising a plurality of bars configured to drive rotation of brake rotor disks, each bar having an end finger engaged in one of the orifices receiving one of the pegs.

2. The rim according to claim 1, wherein the root of the key extends to define two lugs, each lug being engaged on one of the pegs.

3. The rim according to claim 1, wherein the root of the key is engaged on the peg.

4. The rim according to claim 1, wherein a bronze insert is interposed between the head of the key and the notch of the removable flange.

5. The rim according to claim 1, wherein the head of the key includes a cap.

6. The rim according to claim 1, wherein the keys are grouped in pairs, each pair having a common root engaged on two pegs.

7. The rim according to claim 1, wherein one of the main portion and the removable portion comprises an aluminum alloy.

8. The rim according to claim 7, wherein the other of the main portion and the removable portion comprises an aluminum alloy.

9. An aircraft wheel rim, comprising a main portion and a removable portion, the main portion comprising a hub, a disk extending between the hub, and an annular outer portion configured to receive a tire and having a flange at a first side, a second side of the annular outer portion being shaped to receive the removable portion, the removable portion forming a removable flange configured to be fitted onto the annular outer portion after a tire has been put into place, the rim including a blocking element configured to block movement in rotation of the removable flange relative to the rim, wherein the blocking element comprises at least one key having a head engaged in a matching notch in the removable portion, and a root fastened by at least one steel peg that is shrink fitted in the main portion and that extends parallel to an axis of rotation of the wheel in order to project from the rim and receive the root of the key, wherein the peg is engaged in an orifice in the rim that extends parallel to an axis of rotation of the rim, the rim further comprising a plurality of bars configured to drive rotation of brake rotor disks, each bar having an end finger engaged in one of the orifices receiving one of the pegs.

* * * * *

UNITED STATES PATENT AND TRADEMARK OFFICE
CERTIFICATE OF CORRECTION

PATENT NO. : 11,305,578 B2  
APPLICATION NO. : 15/826564  
DATED : April 19, 2022  
INVENTOR(S) : X. Delayre Page 1 of 1

It is certified that error appears in the above-identified patent and that said Letters Patent is hereby corrected as shown below:

On the Title Page

| Column | Line | |
|---|---|---|
| Item (57) Abstract | 4 | change "rim one" to -- rim on one -- |
| Item (57) Abstract | 11 | change "include at" to -- includes at -- |

Signed and Sealed this  
Thirteenth Day of June, 2023

Katherine Kelly Vidal  
*Director of the United States Patent and Trademark Office*